Oct. 3, 1961 J. A. CHESNUT ET AL 3,002,770
THREADED JOINT WITH LUBRICATING AND SEALING RIBBON
INTERPOSED BETWEEN THE THREADS
Filed Oct. 29, 1959 2 Sheets-Sheet 1
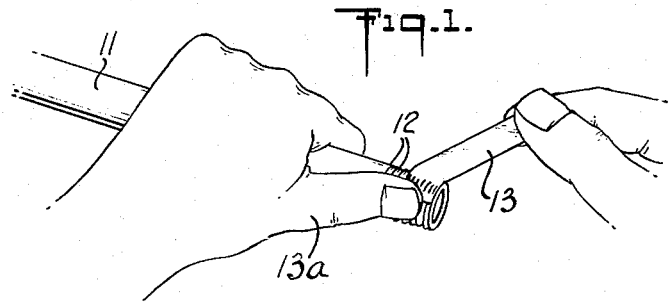
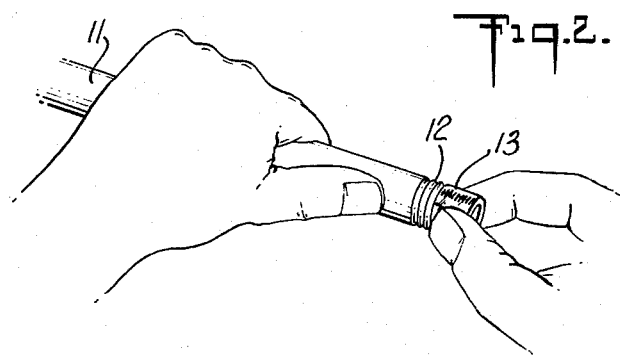
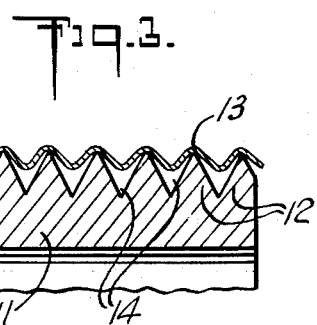
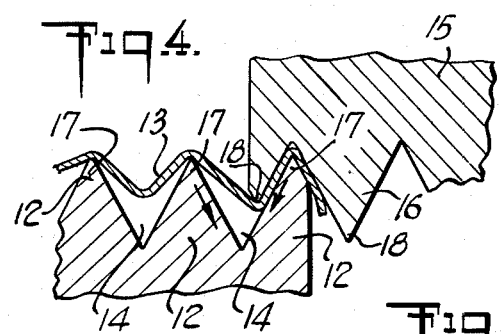
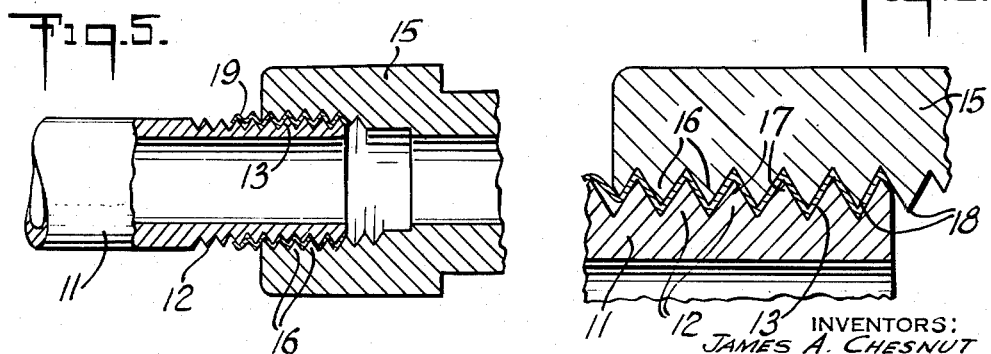
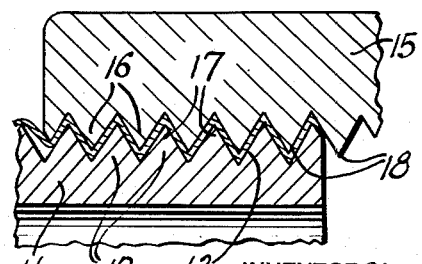
INVENTORS:
JAMES A. CHESNUT
JOSEPH D. SINGALEWITCH
BY
Charles A. Harris
ATTORNEY

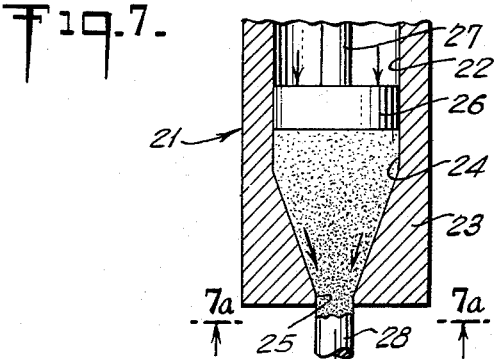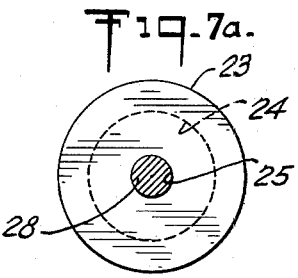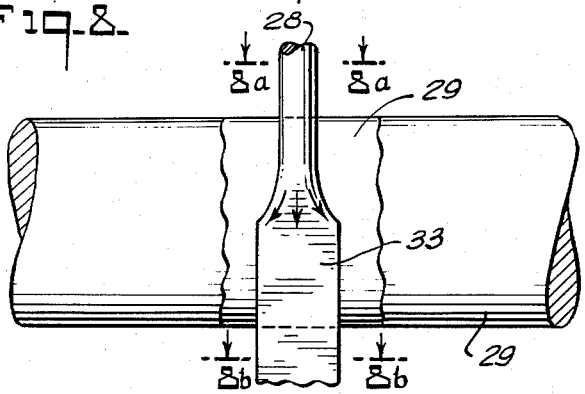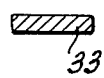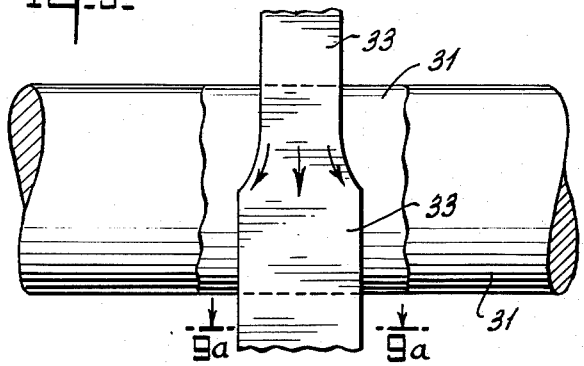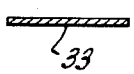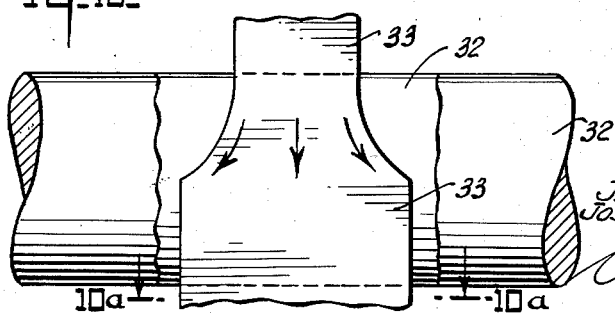

United States Patent Office 3,002,770
Patented Oct. 3, 1961

3,002,770
THREADED JOINT WITH LUBRICATING AND SEALING RIBBON INTERPOSED BETWEEN THE THREADS
James A. Chesnut, Metuchen, and Joseph D. Singalewitch, Bloomfield, N.J., assignors to Johnson & Johnson, a corporation of New Jersey
Filed Oct. 29, 1959, Ser. No. 849,536
3 Claims. (Cl. 285—94)

The present invention relates to threaded joints and methods of sealing them, more particularly to such joints which are sealed by a layer of material in ribbon or strip form.

This application is a continuation-in-part of our co-pending application Serial No. 767,116, filed October 14, 1958, now abandoned.

The present invention contemplates a threaded joint comprising mating male and female fittings and a preformed transversely stretchable and compressible lubricating and sealing ribbon wrapped circumferentially around the threads of the male fitting and occupying the space between the male and female fittings when the fittings are turned together to make up the joint. The ribbon is formed from a coherent unsintered polytetrafluoroethylene film having a density in the range of about 1.2–1.8 and being about 1–20 mils in thickness; and is relatively slippery, possessing a low coefficient of friction and a high degree of lubricity.

According to the method of this invention, the ribbon is wrapped circumferentially around the male threads of the male fitting by applying longitudinal tension to the ribbon while pressing it into contact with the male threads. Because of its slipperiness, the ribbon tends to slip off the threads. However, the ribbon also is self-adhering so that when one or more turns, or wraps, around the male fitting has been completed and the ends of the ribbon are overlapped, the overlapping portions of the ribbon are pressed into adhering relation with one another to hold the ribbon in position on the fitting. The ribbon is gradually stretched in the direction of its width and compressed to conform to the shape of the threads first by pulling it against the threads in the initial wrapping operation and then by turning the female fitting onto the male fitting with the strip in position on the male fitting. This turning action is continued until the ribbon conforms substantially with the shape of the space between the male and female threads when these threads are turned together with the ribbon between them. Because of the lubricity of the ribbon, a relatively small amount of torque is needed to make up the joint and the female fitting may be turned easily onto the male fitting.

In the resulting joint the ribbon remains in substantially continuous film form between the tips of the threads and provides a barrier between the threads and a lubricated surface for turning the fittings with respect to one another. Thus, the joint may be reopened quite easily even after long periods of time merely by turning the female fitting in the reverse direction off the male fitting. The ribbon remains compressible so that the joint may be opened in this fashion and remade several times to provide an effective joint. In fact, this joint is so effective that it may be used in piping or other vessels carrying the most corrosive materials which normally are difficult to contain in a tight system. For example, these include sulphuric acid, caustic soda, formaldehyde, various alcohols, toluene, acetone, aviation gasoline, motor oil, jet fuel, kerosene, liquid oxygen, and various other materials.

The effectiveness of the joint of this invention and the method of making the joint depend to a large extent upon the fact that the polytetrafluoroethylene ribbon is in the form of a coherent film which is transversely stretchable and compressible. In order to apply the ribbon in accordance with the method of this invention, it is necessary that the strip possess sufficient longitudinal tensile strength so that it may be stretched around the threads and a cross tensile strength sufficient to resist splitting forces created by the resistance of the threads. It is preferred that the longitudinal tensile strength be considerably greater than the cross tensile strength, since this makes it easier for the ribbon to conform to the shape of the threads while remaining in substantially continuous coherent form. For instance, it is preferred that the ratio of the longitudinal to cross tensile strength of the strip fall within the range of about 2 to 1–20 to 1 and that its longitudinal tensile strength be within the range of about 400–3000 pounds per square inch when its cross tensile strength is within the range of about 50–800 pounds per square inch, assuming tensile values are determined using a Thwing Albert Tensile Tester having a stress-strain gauge and recorder with a jaw separation speed of 1 inch per minute and an initial jaw separation of 2 inches for longitudinal tensile testing and ¼ inch for cross tensile testing. At any rate, the ribbon is stretchable transversely, or in the direction of its width, and compressible so that it is adapted to be stretched down the inclined side walls of the threads and conformed substantially with the shape of the threads without tearing or pulling apart. Thus, the joint may be made up in such a way that the ribbon remains in the form of a continuous film even though it conforms almost exactly with the shape of the threads. If the joint is made up very tightly and particularly if the tips of the threads are very sharp or jagged, the tips of the threads tend to cut through the ribbon. Even then the ribbon remains in substantially continuous film form between the tips of the threads and provides a compressible barrier between the threads and a lubricated surface for turning the fittings with respect to one another for opening and resealing the joint.

The lubricating and sealing ribbon used in the method of this invention and in the resulting joint is in the form of a preformed coherent film of polytetrafluoroethylene which is unsintered, i.e., it has not been subjected to heat up to and above the sintering temperature for polytetrafluoroethylene to cause the particles to coalesce or fuse together. Polytetrafluoroethylene has a sharp transition point at the sintering temperature, 620° F., at which it changes from the crystalline to the amorphous state. This transition is reversible as the material is cooled below the sintering temperature. In its amorphous state, the material flows together to provide a uniform and densified structure. On the other hand, unsintered polytetrafluoroethylene normally is not as uniform and is considerably less dense.

One way of providing a preformed, coherent film of unsintered polytetrafluoroethylene is by the extrusion and calendering of polytetrafluoroethylene from its powdered form. Polytetrafluoroethylene powder comprising particles which may average about 0.2 to 0.3 microns in diameter is mixed with a small amount of an extrusion aid, such as naphtha or white oil, and ram-extruded through an orifice under longitudinal and transverse compressive forces into a coherent strip or rod of polytetrafluoroethylene. The orifice may be designed so as to extrude the polytetrafluoroethylene directly from a powder into a strip suitable for use in accordance with this invention; or the powder may be extruded into a strip or rod which must be calendered, as will be described more fully hereinafter, or otherwise treated to form a strip suitable for use in accordance with this invention. In either case, after extrusion or calendering as the case may be, the resulting strip or film may be run through an oven or a similar heating device at a relatively low temperature to evaporate the extrusion aid from the film. The strip may be rolled to the exact thickness desired by conventional calender rolls. During the extrusion process, the polytetrafluoroethylene particles are pressed into cohering side-by-side relation to one another. Even though the particles cohere sufficiently to provide a coherent film which may be stretched over the male threads of a pipe joint without tearing, for example, the particles apparently are not coalesced as they would be in a sintered polytetrafluoroethylene film. As a result, the specific gravity of the coherent unsintered polytetrafluoroethylene film of this invention is in the range of about 1.2–1.8, normally about 1.6, at normal atmospheric temperature and pressure as compared with about 2.2 for a similar sintered polytetrafluoroethylene film, the specific gravity of water being taken as unity; and the polytetrafluoroethylene ribbon of this invention is relatively compressible due to its low density. For most applications, films according to this invention should be no less than about one mil in thickness in order to provide sufficient strength for application and use.

Other features and advantages of the method and joint of this invention will be apparent from the following description and claims taken together with the drawings wherein:

FIG. 1 is a schematic view in perspective showing the application of the lubricating and sealing ribbon of this invention to a male pipe fitting.

FIG. 2 is a similar schematic view in perspective showing the way in which the ends of the lubricating and sealing ribbon are overlapped for self-adherence in making up a joint according to this invention.

FIG. 3 is a greatly enlarged schematic sectional view of a portion of the male pipe fitting of FIGS. 1 and 2 showing the lubricating and sealing ribbon in place on the male fitting prior to making up the joint.

FIG. 4 is a very greatly enlarged schematic sectional view of a portion of the male fitting of the previous figures showing how the lubricating and sealing ribbon is stretched downward into the threads to conform to the shape of the threads as the female fitting is turned onto the male fitting.

FIG. 5 is an enlarged schematic sectional view of the male fitting of the previous figures after it has been turned into a corresponding female fitting to form a joint with the lubricating and sealing ribbon in position between the male and female fittings.

FIG. 6 is a greatly enlarged schematic sectional view of a portion of the joint of FIG. 5 showing how the lubricating and sealing ribbon conforms to the space between the fitting.

FIG. 7 is a schematic view partly in section and partly in elevation of a ram-extrusion block and orifice showing one step in the formation of a lubricating and sealing ribbon suitable for use in the method and joint of this invention.

FIG. 7a is a schematic view partly in section and partly in plan taken along the line 7a—7a of FIG. 7.

FIG. 8 is a fragmentary schematic view in elevation of the first of a series of progressive calendering steps in the formation of a lubricating and sealing ribbon suitable for use in accordance with this invention.

FIG. 8a is a schematic sectional view taken along the line 8a—8a of FIG. 8.

FIG. 8b is a schematic sectional view taken along the line 8b—8b of FIG. 8.

FIG. 9 is a fragmentary schematic view in elevation of the second calendering step in the above series.

FIG. 9a is a schematic sectional view along the line 9a—9a of FIG. 9.

FIG. 10 is a fragmentary schematic view in elevation of the third calendering step in the above series.

FIG. 10a is a schematic sectional view along the line 10a—10a of FIG. 10.

Referring to the drawings, there is shown a male pipe fitting 11 having threads 12 at one end. A length of a coherent transversely stretchable and compressible self-adhering lubricating and sealing ribbon 13 of unsintered polytetrafluoroethylene meeting the requirements of this invention is wrapped circumferentially around the male threads of the male fitting by applying longitudinal tension to the ribbon 13 while pressing it into contact with the threads 12. One end of the ribbon is held against the threads by the thumb 13a of the hand holding the fitting, for instance, while the other hand holds the end of the ribbon 13 under tension and swings it around the fitting until the two ends of the ribbon overlap after at least one turn of the ribbon is wrapped around the male threads, as shown in FIG. 2. Also as shown in FIG. 2, the overlapping portions of the ribbon are pressed into adhering relation with one another so that they stick together and the ribbon is held in position on the threads 12 of the male fitting. It is quite important that the ribbon adhere to itself in this way, since it possesses a relatively low coefficient of friction and a high degree of lubricity and therefore tends to slip off the fitting. The tension applied in wrapping the ribbon 13 around the threads 12 need only be sufficient to cause the ribbon to stretch gradually transversely and conform somewhat to the shape of the threads. As shown in FIG. 3, the ribbon stretches somewhat transversely and enters the grooves 14 between the threads 12 to a certain extent. At this point the ribbon need not enter the grooves completely or conform exactly to the shape of the threads. However, it may be wrapped more tightly about the male threads 12 in such a way that it will stretch transversely somewhat more and conform to the shape of the threads to a greater extent.

To make up a joint, a female fitting 15 having female threads 16 adapted to conform to the shape of the male threads 12 merely is turned onto the male fitting 11 carrying the preformed lubricating and sealing ribbon 13 until a joint is formed. The male and female fittings are turned with respect to one another to again stretch the ribbon gradually in the direction of its width and compress it, as shown in FIG. 4, until the ribbon conforms substantially with the shape of the space between the male and female threads 12 and 16, respectively, when these threads are turned together with the ribbon between them as shown in FIGS. 5 and 6. Referring to FIG. 4, it will be seen that as the female fitting is turned onto the male fitting the ribbon 13 which more or less has been draped into the grooves 14 between the male threads 12 is stretched downwardly as indicated by the arrows along the faces of the threads 12 in the direction of the width of the ribbon until the ribbon 13 is pressed downwardly into the grooves 14 between the male threads by the tips 18 of the female threads 16. The ribbon 13 is compressed as it is being stretched so that by the time the fittings are turned together fairly tightly, as shown in FIGS. 5 and 6, the ribbon 13 conforms substantially with the shape of the space between the male and female threads. As the joint is made up, the ribbon 13 on the male fitting 11 acts as a lubricant which facilitates the screwing of the male and female fittings together.

As shown in FIGS. 5 and 6, after the joint is made up, the ribbon remains in substantially continuous film form between the tips of the threads 12 and 16 and provides a barrier between the faces of the threads as well as a lubricated surface for turning the fittings with respect to one another. In view of the compressibility of the polytetrafluoroethylene ribbon 13 and the ease with which the joints can be made up by turning the fittings 11 and 15 with respect to one another, it is not necessary that as much torque be applied in making up the joint as is necessary with conventional pipe thread sealants, for example. When the male and female fittings are turned together with the ribbon compressed between them as described above, a tightly sealed joint is provided which is highly effective against all manner of materials including acids and bases and various solvents, vapors and gases including those specifically mentioned elsewhere in this application, even at high and low temperatures. The ribbon remains substantially continuous and retains its integrity and its compressibility so that the joint may be opened for any reason merely by unscrewing the male and female fittings and then closed with the ribbon acting as a resilient lubricating and sealing medium to again provide an effectively sealed joint.

It is advantageous in some cases that the ribbon 13 be wide enough so that a portion 19 of the ribbon extends beyond the end of the female fitting 15 after the joint first is made up. When the male and female fittings are separated after the joint has been made up for some time, the ribbon which has been held in place between the fittings during this time will remain compressed to a certain extent. Ordinarily, this means that when the joint is remade the female fitting will turn a little bit farther onto the male fitting and stretch and compress somewhat more of the polytetrafluoroethylene ribbon than it did the first time. The fittings may be turned together as much as one half a turn or more farther, in which case the portion 19 of the ribbon which extended beyond the end of the female fitting when the joint first was made up will become compressed between the fittings and aid in making up the joint. This particularly is true when the pitch lines of the threads are tapered, since, for a given torque, turning of the female fitting with respect to the male fitting will stop at the point at which the compressive resistance of the ribbon balances the torque applied. Since the ribbon remains compressed to a certain extent when the joint is opened, the amount of compressive resistance presented by the portion of the ribbon previously between the male and female fittings will not be as great each time the joint is made up as it was the preceding time. Thus, ordinarily when the pitch lines of the threads are tapered, the female fitting is turned farther onto the male fitting in successive uses of the joint, and progressive portions of the ribbon are presented for stretching and compression between the fittings in successive uses of the joint.

Referring to FIGS. 7 and 7a, there is shown a ram-extrusion block 21 for use in forming a lubricating and sealing ribbon according to one embodiment of the invention which comprises a pressure cylinder 22 terminating in a tapered frustro-conical extrusion orifice 23 having cylindrical inlet and outlet openings 24 and 25, respectively. The inlet opening 24 of the extrusion orifice has the same internal diameter as the pressure cylinder 22 but the outlet opening 25 is considerably smaller in diameter than the pressure cylinder. The block is filled with a mixture of polytetrafluoroethylene extruding powder and the necessary amount of an extrusion aid of the type mentioned hereinafter and pressure is applied to the mixture by a cylindrical piston 26 to extrude the polytetrafluoroethylene through the orifice 23. The piston 26 is connected to a piston rod 27 which, in turn, is connected to conventional means, not shown, for driving the piston. Polytetrafluoroethylene extruding powder such as Teflon 6 manufactured by E. I. Du Pont de Nemours & Co., Inc. and having an average particle diameter of about 0.2 to 0.3 microns has been found suitable for forming a lubricating and sealing ribbon according to this invention when mixed with an amount of white oil weighing in the order of about 20 percent of the mixture of white oil and powder. With the extrusion orifice having approximately the shape shown in FIG. 7 and the outer opening 25 of the orifice having a diameter of approximately ⅜ inch, when the mixture contains about 19½ percent white oil, a typical extrusion pressure for a given orifice might be about 2000 p.s.i. However, if the percentage of white oil or other extrusion aid is increased, the extrusion pressure drops rapidly. For instance, when the mixture contains about 20½ percent white oil, the extrusion pressure may be around 1250 p.s.i. using the same orifice.

The polytetrafluoroethylene particles are pressed into cohering side-by-side relationship with one another under longitudinal and transverse compressive forces during the extrusion step to form a coherent cylindrical rod 28 of polytetrafluoroethylene. The longitudinal compressive forces, of course, are derived directly from the pressure of the piston 26 downwards upon the body of polytetrafluoroethylene particles. The transverse compressive forces are the transverse vector components of the forces causing the particles to come together and flow through the orifice 23. In other words, since the particles must move toward the centerline of the orifice to get through the smaller outlet opening 25 of the orifice, they are pressed toward one another transversely and caused to come into coherent side-by-side relation to one another. This causes the rod 28 to have coherence and strength in a radial direction.

Assuming that a polytetrafluoroethylene rod 28 is extruded through a ⅜-inch diameter orifice such as that shown in FIGS. 7 and 7a under the above conditions, the resulting rod will have a diameter of approximately ⅜ inch. One way in which this rod 28 may be treated to form a lubricating and sealing ribbon suitable for use in accordance with this invention is shown in FIGS. 8 to 10a. As shown in these figures, the rod is calendered down in three steps to a ribbon approximately 5 to 6 inches wide and having a thickness of about .004 inch using successive pairs of calender rolls, 29, 31 and 32. The rolls are heated to approximately 170° F., well below the sintering temperature for polytetrafluoroethylene; and the nip space between the rolls in each case is adjusted to produce polytetrafluoroethylene strips of the desired thickness. The calendering is performed with substantially no longitudinal tension on the polytetrafluoroethylene roll or strip, as the case may be, to assure that the desired transverse compressive forces will occur during calendering to press the polytetrafluoroethylene particles into cohering side-by-side relation with one another as the rod or strip is reduced in thickness. The forces working upon the polytetrafluoroethylene particles during calendering are represented by the arrows in FIGS. 8, 9 and 10. The transverse compressive forces would be represented by the transverse components of these arrows.

The gap between the rolls 29 in the first calendering step is set at 3/16 inch, and the rod 28 is passed through the nip between the rolls under substantially no tension to provide a strip approximately ¾ to 1 inch wide and approximately 3/16 inch thick. The approximate change in cross section of the polytetrafluoroethylene from the rod 28 to a strip 33 is illustrated in the comparison between FIGS. 8a and 8b, representing their respective configurations before and after the first calendering step.

In the second calendering step, the strip 33 shown in FIGS. 8 and 8b is passed through calender rolls 31 heated as described above and set approximately 0.07 to 0.08 inch apart to decrease the thickness of the strip 33 to about 0.07 to 0.08 inch and increase its width to about 2 inches, as shown schematically in FIG. 9a. The strip 33 of FIGS. 9 and 9a then is run through the nip formed by a third set of calender rolls 32, as shown in FIGS. 10 and 10a to decrease the thickness of the strip 33 to about 0.004 inch and increase its width to about 5 to 6 inches. The strip 33 then is heated at about 300° F. for a short period of time such as one half a minute to evaporate the white oil therefrom. The resulting strip normally is cut by a conventional technique, not shown, into narrower strips, or ribbons, suitable for use as lubricating and sealing ribbons in accordance with this invention.

Having now described the invention in specific detail and exemplified the manner in which it may be carried into practice, it will be readily apparent to those skilled in the art that innumerable variations, modifications, applications, and extensions of the basic principles involved may be made without departing from its spirit and scope.

What is claimed is:
1. A threaded joint comprising a male fitting having continuous male threads, a female fitting having continuous female threads adapted to mate with the threads on the male fitting, and a preformed transversely stretchable and compressible lubricating and sealing ribbon having a relatively low coefficient of friction and a high degree of lubricity wrapped circumferentially around the threads of the male fitting for at least one turn therearound with the ends of the ribbon overlapped one upon the other by an appreciable amount, said overlapping end portions of the ribbon adhering to one another when pressed into contact by hand, said ribbon prior to turning the male and female fittings together being in the form of a flat coherent unsintered polytetrafluoroethylene film having a specific gravity in the range of about 1.2–1.8 and being about 1 to 20 mils in thickness, the male and female fittings being turned together with the ribbon compressed and conforming substantially with the shape of the space between the male and female threads and defined by said threads when the threads are turned together with the ribbon between them, the ribbon remaining in substantially continuous film form on the faces of the threads between the tips of said threads and providing an antibinding and sealing barrier between the threads and a lubricated surface for turning the fittings with respect to one another at any time during the life of the joint, whereby there is provided a joint possessing the following properties:

(a) leakproof tightness at low torque,
(b) retention of leakproof tightness for the life of the joint, and
(c) ease of opening the joint during its life.

2. A threaded joint according to claim 1 wherein the joint possesses resealability to obtain a joint possessing said properties without the necessity for replacing the lubricating and sealing ribbon.

3. A reusable threaded joint according to claim 2 wherein the pitchliness of the threads are tapered and the female fitting is adapted to be turned farther onto the male fitting in successive uses of the joint and new portions of the ribbon are adapted to be presented for stretching and compression between the fittings in successive uses of the joint.

References Cited in the file of this patent

UNITED STATES PATENTS

| | | |
|---|---|---|
| 2,145,168 | Flagg | Jan. 24, 1939 |
| 2,407,552 | Hoesel | Sept. 10, 1946 |
| 2,578,523 | Llewellyn | June 30, 1950 |
| 2,586,357 | Llewellyn | June 30, 1950 |

FOREIGN PATENTS

| | | |
|---|---|---|
| 37,682 | Austria | Jan. 1, 1909 |

UNITED STATES PATENT OFFICE
CERTIFICATION OF CORRECTION

Patent No. 3,002,770                                    October 3, 1961

James A. Chesnut et al

It is hereby certified that error appears in the above numbered patent requiring correction and that the said Letters Patent should read as corrected below.

Column 8, under the heading "UNITED STATES PATENTS" add the following:

| | | |
|---|---|---|
| 351,605 | Kennedy | Oct. 26, 1886 |
| 1,875,708 | Couhig | Jan. 28, 1930 |
| 2,319,124 | Goldberg et al | July 11, 1942 |
| 2,823,724 | Gill | Sept. 23, 1955 | same column 8, under the heading "FOREIGN PATENTS" add the following:

770,774                    Great Britain --------------- June 14, 1954

Signed and sealed this 27th day of March 1962.

(SEAL)
Attest:

ERNEST W. SWIDER                                  DAVID L. LADD

Attesting Officer                                    Commissioner of Patents